United States Patent [19]
Baumann

[11] Patent Number: 6,076,799
[45] Date of Patent: Jun. 20, 2000

[54] ROTARY VALVE ACTUATOR AND LINKAGE

[75] Inventor: Hans D. Baumann, Rye, N.H.

[73] Assignee: Fisher Controls International, Inc., Clayton, Mo.

[21] Appl. No.: 09/026,254

[22] Filed: Feb. 19, 1998

Related U.S. Application Data

[63] Continuation-in-part of application No. 08/631,583, Apr. 12, 1996, Pat. No. 5,924,671.

[51] Int. Cl.[7] .................................................. F16K 31/143
[52] U.S. Cl. ................................ 251/62; 251/58; 251/285
[58] Field of Search ................................ 251/58, 62, 285

[56] References Cited

U.S. PATENT DOCUMENTS

| | | |
|---|---|---|
| 350,460 | 10/1886 | Leslie . |
| 2,358,186 | 9/1944 | Pond ......................................... 121/41 |
| 2,839,319 | 6/1958 | Hobart ....................................... 287/3 |
| 2,856,214 | 10/1958 | Schrimshaw .............................. 287/54 |
| 3,104,592 | 9/1963 | Sheesley ..................................... 92/13 |
| 3,261,266 | 7/1966 | Ledeen et al. ............................ 92/138 |
| 3,709,106 | 1/1973 | Shafer ....................................... 92/138 |
| 3,727,523 | 4/1973 | Gulick ....................................... 92/130 |
| 3,801,062 | 4/1974 | Arn et al. ................................... 251/14 |
| 3,985,151 | 10/1976 | Smith ....................................... 137/269 |
| 4,187,764 | 2/1980 | Cho .......................................... 91/442 |
| 4,345,850 | 8/1982 | Baumann ................................. 403/373 |
| 5,305,987 | 4/1994 | Baumann ................................. 251/298 |

FOREIGN PATENT DOCUMENTS

| | | |
|---|---|---|
| 0 023 120 | 1/1981 | European Pat. Off. . |
| 2 324 966 | 4/1977 | France . |
| 19 43 790 | 3/1970 | Germany . |
| 21 34 489 | 6/1972 | Germany . |
| 26 39 960 | 3/1977 | Germany . |
| 1 240 746 | 7/1971 | United Kingdom . |
| 1519583 | of 1978 | United Kingdom . |
| WO96/39591 | 12/1996 | WIPO . |
| WO97/36269 | 10/1997 | WIPO . |

*Primary Examiner*—A. Michael Chambers
*Attorney, Agent, or Firm*—Wolf, Greenfield & Sacks, P.C.

[57] ABSTRACT

A rotary valve actuator and linkage include an actuator having a tubular housing with end caps and a piston that is moved by fluid pressure against a compression spring. A rolling diaphragm is used to bias the piston. A pair of ports are provided on opposite sides of the housing, and a linkage having two arms is interconnected with the piston through the ports. The linkage is coupled to a rotary valve shaft and linear movement of the piston causes rotational movement of the shaft. The linkage includes two separate arms and a centerpiece. In one embodiment, the arms and the centerpiece interengage each other at angled surfaces that force the centerpiece and the arms into radial engagement with the shaft when axial compression is provided to the arms and centerpiece to force them toward each other. In another embodiment, each of the linkage arms is provided with a collet having radially movable portions. The collet is forced into a recess in the centerpiece, causing the radially movable portions to be locked in engagement with the shaft.

15 Claims, 14 Drawing Sheets

ROTARY VALVE ACTUATOR AND LINKAGE

CROSS REFERENCE TO RELATED APPLICATION

This application is a continuation-in-part of application Ser. No. 08/631,583 filed Apr. 12,1996.

FIELD OF THE INVENTION

The present invention relates generally to a rotary valve actuator and a linkage for an actuator and, more particularly, to a simplified actuator mechanism that can be produced at lower cost and which occupies less space than prior art actuator and linkage mechanism.

BACKGROUND OF THE INVENTION

It is common in the use of rotationally actuated valves, such as rotary plug valves and butterfly valves, to employ an actuator that resolves a linear actuator translation into a rotational moment. This rotation is used to open and close the valve gate or plug. One such rotary valve is shown and described in U.S. Pat. No. 5,305,987 to Baumann. In this patent, a linkage is provided at the end of the shaft. This linkage is interconnected with a linear actuating device. Such actuators often include large mechanical housings that receive air and cause translation of the linear actuator component by interaction with a rolled diaphragm that moves in response to applied pressure. The housing is supported relative to the valve casing by a large framework that provides room for the required linkages to move.

The above-outlined approach to constructing a rotary valve unit is effective but requires a good deal of space around the actual valve casing for the actuator mechanism. Similarly, the actuator mechanism is relatively complex and, thus, is expensive to construct and service. Servicing itself is difficult because the housing must be assembled and disassembled under the pressure of a long compression spring. The assembly and disassembly requires the respective attachment and removal of several bolts and other components.

It has also been recognized that the linkages that resolve linear translation into rotational shaft movement are often prone to backlash and/or may be difficult to assemble onto a shaft. Many rotary valve shafts have a square cross section which can create backlash if the linkage is not accurately sized to the shaft. A splined shaft would reduce backlash, but would make misalignment of the linkage more likely since the linkage can be positioned in a large number of rotational orientations. However, a square cross section is more prone to enable play between the linkage and the shaft as the linkage is rotated to, in turn, rotate the shaft. The use of set screws or complicated clamps to increase the strength between the linkage and the shaft have been contemplated, but these structures add to the complexity of the interconnection between components and thus increase costs in assembly time for a valve. U.S. Pat. No. 4,345,850 to Baumann teaches a novel rotary valve linkage arrangement in which moments are generated in each of two opposing arms that "jam" the two arms into firm engagement with the square shaft end. The application of this linkage arrangement is limited to instances in which the two arms are in relatively close proximity to each other since the arms must bear against each other to generate the necessary moment for a secure engagement. It is thus desirable to provide a linkage that firmly engages a shaft and yet enables a greater spacing between arm sections.

It is therefore an object of this invention to provide a rotary valve actuator assembly that is reliable, easy to maintain and that occupies less space than a more conventional actuator. The actuator should be usable with a variety of types of rotary valves and should enable rotation in each of opposing directions with relative accuracy. The actuator should generate sufficient torque to power most small to midsize valves. A linkage that can be used in conjunction with the actuator should enable firm engagement of a square or otherwise shaped shaft when two or more arms of the linkage are spaced at a predetermined distance from each other.

SUMMARY OF THE INVENTION

According to a first aspect of the invention, a rotary valve actuator assembly is provided. The rotary valve actuator assembly comprises a tubular housing, a piston mounted in the tubular housing and movable relative to the tubular housing along an axis of the tubular housing, a linkage coupled between the piston and a rotary shaft, and a fluid pressure source coupled within the housing for moving the piston along the axis. Movement of the piston along the axis causes the linkage to rotate the shaft. The linkage comprises at least one arm assembly including a linkage arm having a slot and a connecting pin rotatably mounted in the piston and slidably engaging the slot in the linkage arm.

In a preferred embodiment, the linkage comprises first and second arm assemblies mounted on the shaft and coupled to opposite sides of the piston. The connecting pin slides in the slot of the linkage arm as the piston moves within the tubular housing.

According to another aspect of the invention, a rotary valve actuator assembly is provided. The rotary valve actuator assembly comprises a tubular housing, a piston mounted in the tubular housing and movable relative to the tubular housing along an axis of the tubular housing, a linkage coupled between the piston and a rotary shaft, and a fluid pressure source coupled within the housing for moving the piston along the axis. Movement of the piston along the axis causes the linkage to rotate the shaft. The linkage comprises at least one arm assembly including a linkage arm coupled to the piston and mounted on the shaft, and a locking element mounted on the shaft. The linkage arm includes a collet with two or more radially movable portions. The locking element has at least one recess. The linkage further comprises means for forcing the collet on the linkage arm into the recess in the locking element, such that the radially movable portions of the collet are forced into engagement with the shaft and the linkage arm is locked to the shaft.

In a preferred embodiment, the linkage comprises first and second arm assemblies including first and second linkage arms, respectively, mounted on the shaft on opposite sides of the locking element. The locking element has first and second recesses. The means for applying a force comprises means for forcing the collets into the recesses in the locking element, such that the radially movable portions of the collets are forced into engagement with the shaft and the first and second linkage arms are locked to the shaft.

In a first embodiment, the means for forcing includes an abutment on the shaft for engaging the first linkage arm and an adjustable fastener on the shaft for engaging the second linkage arm. Adjustment of the adjustable fastener causes the collets on the first and second linkage arms to be forced into the recesses in the locking element. In a second embodiment, the means for forcing comprises one or more adjustable couplings. Each adjustable coupling comprises a coupling element having threaded holes at opposite ends thereof, a first adjustable fastener coupled between the first linkage arm and the coupling element and a second adjustable fastener coupled between the second linkage arm and the coupling element. Adjustment of the first or second adjustable fastener causes the collets on the first and second linkage arms to be forced into the recesses in the locking element.

According to a further aspect of the invention, a rotary shaft linkage is provided. The rotary shaft linkage comprise a shaft mounted for rotation about an axis, at least one linkage arm mounted on the shaft and a locking element mounted on the shaft. The linkage arm includes a collet having two or more radially movable portions. The locking element includes a recess. The rotary shaft linkage further comprises means for forcing the collet on the linkage arm into the recess, such that the radially movable portions of the collet are forced into engagement with the shaft and the linkage arm is locked to the shaft.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION

Figure 1:
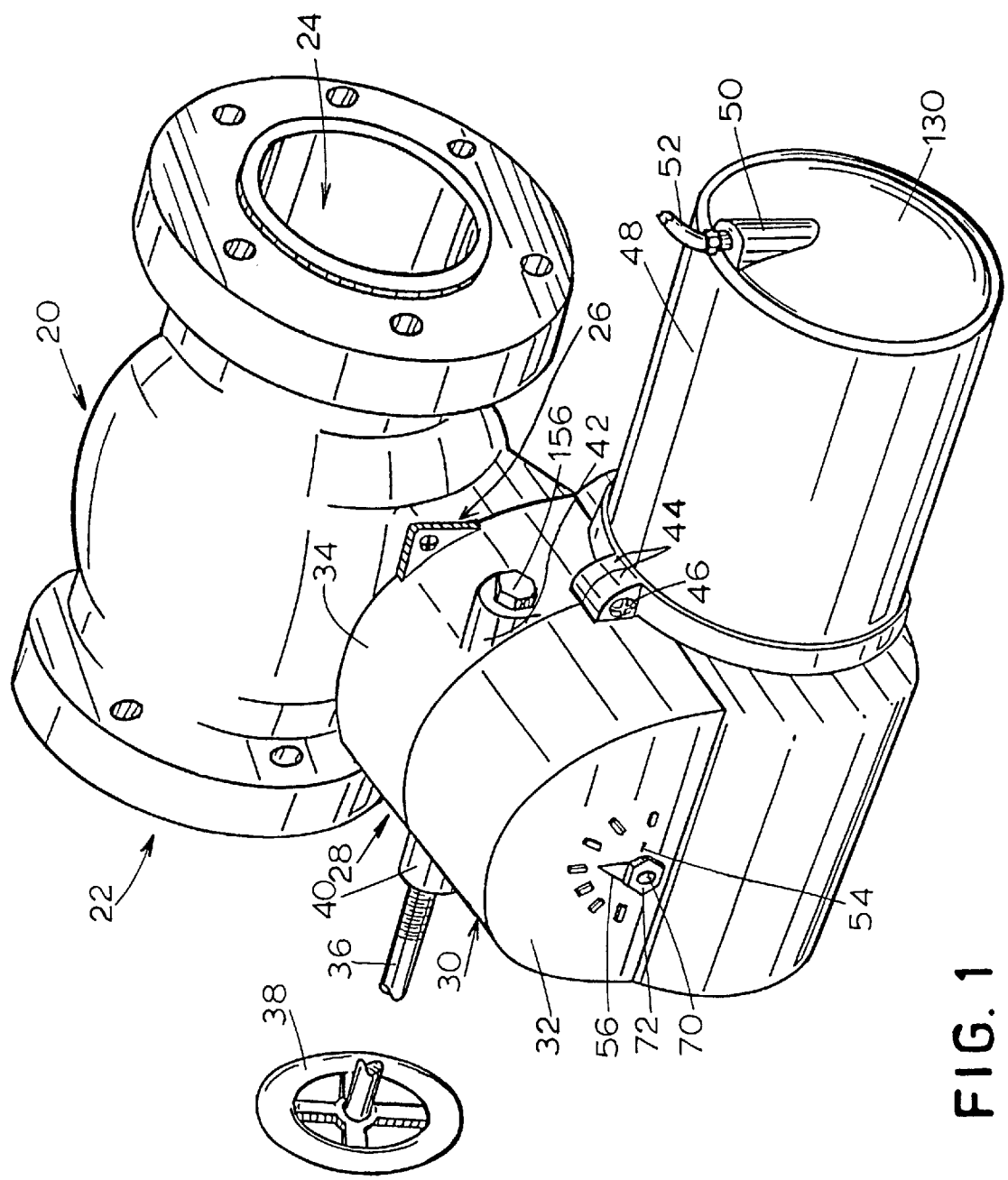
FIG. 1 is a perspective view of a rotary valve and actuator assembly according to a first embodiment of the invention.

FIG. 1 illustrates, in overview, a rotary valve and actuator assembly according to this invention. The valve housing 20 can comprise any type of rotary-actuated valve in which a plug or gate element (not shown) regulates flow between an inlet 22 and an outlet 24 based upon rotational movement of the gate. The valve 20 is connected by a flange assembly 26 to the actuator assembly 28 of this invention. The actuator assembly comprises a housing 30 having a front half 32 and a rear half 34. The rear half engages the flange assembly 26. The housing 30 can be constructed from any appropriate material such as cast aluminum, iron or stainless steel. It can be formed using a casting or stamping process while relatively accurate fitment of the front and rear halves 32 and 34 is desirable, this portion of the housing is not typically airtight and, thus, a variety of inexpensive production processes can be used.

A manual override/limit-stop screw 36 and turn wheel 38 are provided. The screw 36 can be seated in each of two threaded bases 40 and 42 on the rear portion of the housing. The function of the screw 36 is described further below. In this embodiment, the front rear halves 32 and 34 are joined by a series of flanges 44 that receive bolts 46. The two halves 32 and 34 secure therebetween the actuator element 48 according to this invention. The actuator element 48 is formed as an integral unit and, this embodiment, receives fluid pressure through a fitting 50 that is interconnected with a pressure line 52. Fluid pressure in the form of air, another gas or a liquid is utilized to control movement of the actuator element 48 according to this invention.

Relative movement of the actuator is indicated in this embodiment by a scale 54 and moving pointer 56 (FIG. 1) that is attached to an end of the actuator linkage assembly which is shown in more detail in FIGS. 2–6. With reference to FIGS. 2–5, the front half of the housing has been removed to reveal the inner workings of the actuator assembly. The actuator element 48 is formed from a seamless tube in this embodiment constructed from a durable material such as stainless steel. Readily available tube stock can be used according to this embodiment to reduce costs and manufacturing time in connection with the actuator element 48. The actuator element 48 includes a pair of opposing milled ports 60 that expose the interior of the tube. A linkage 62 is operatively connected with the actuator element 48 through the ports 60.

Figure 3:
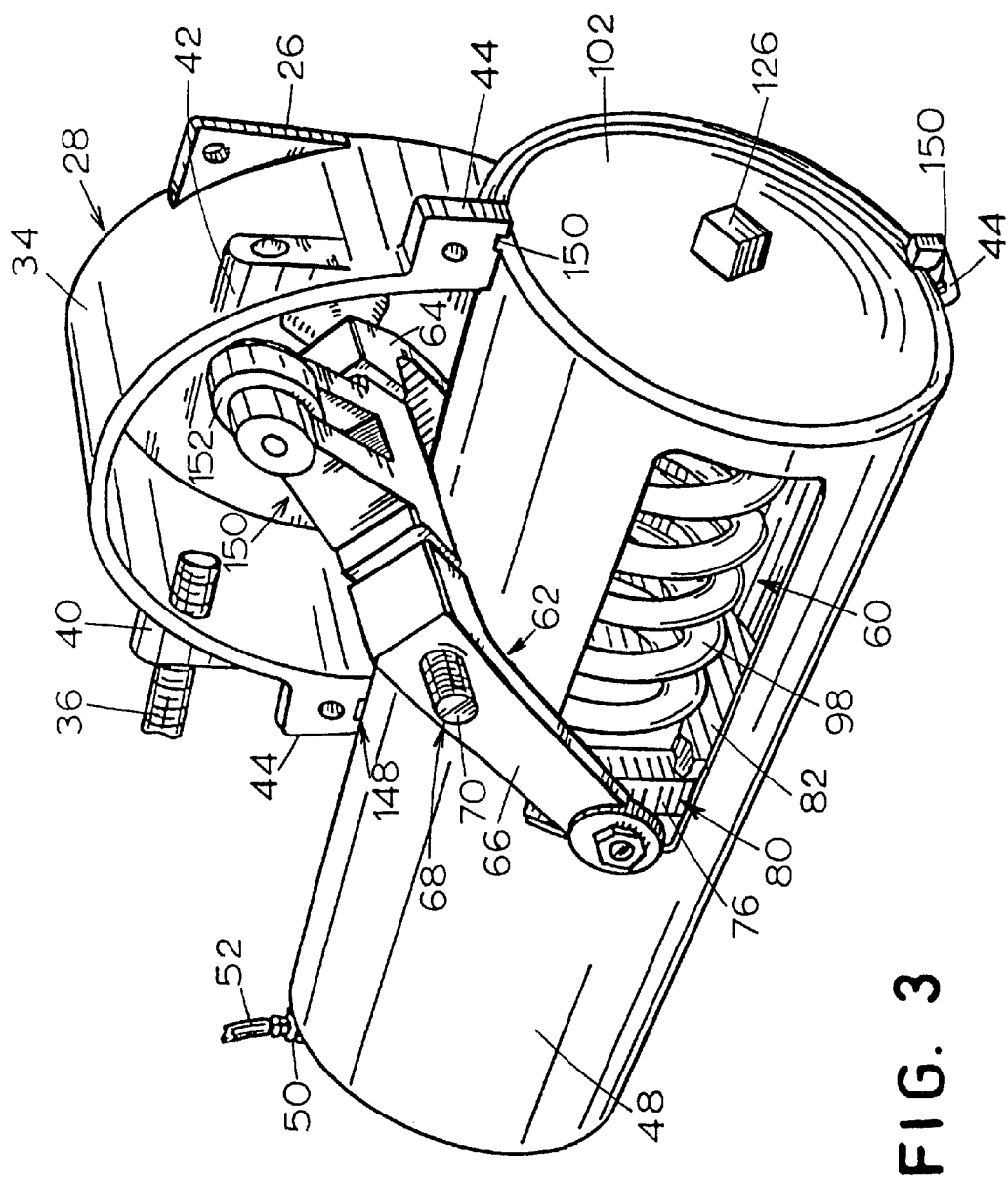
FIG. 3 is an exposed perspective view of the actuator assembly with the orientation of the actuator reversed.
Figure 4:
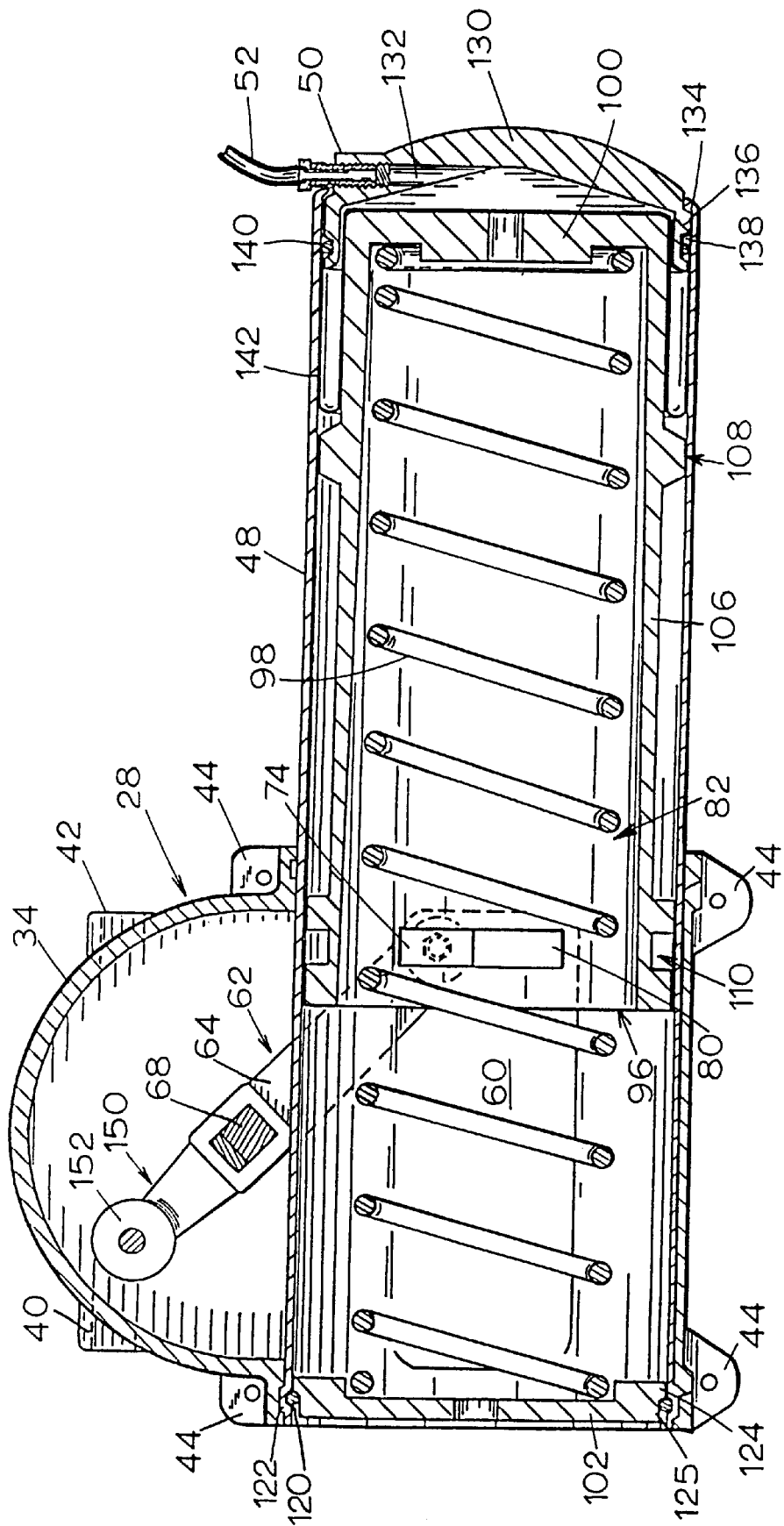
FIG. 4 is a side cross-section of the actuator assembly taken along line 4—4 of FIG. 2.
Figure 5:
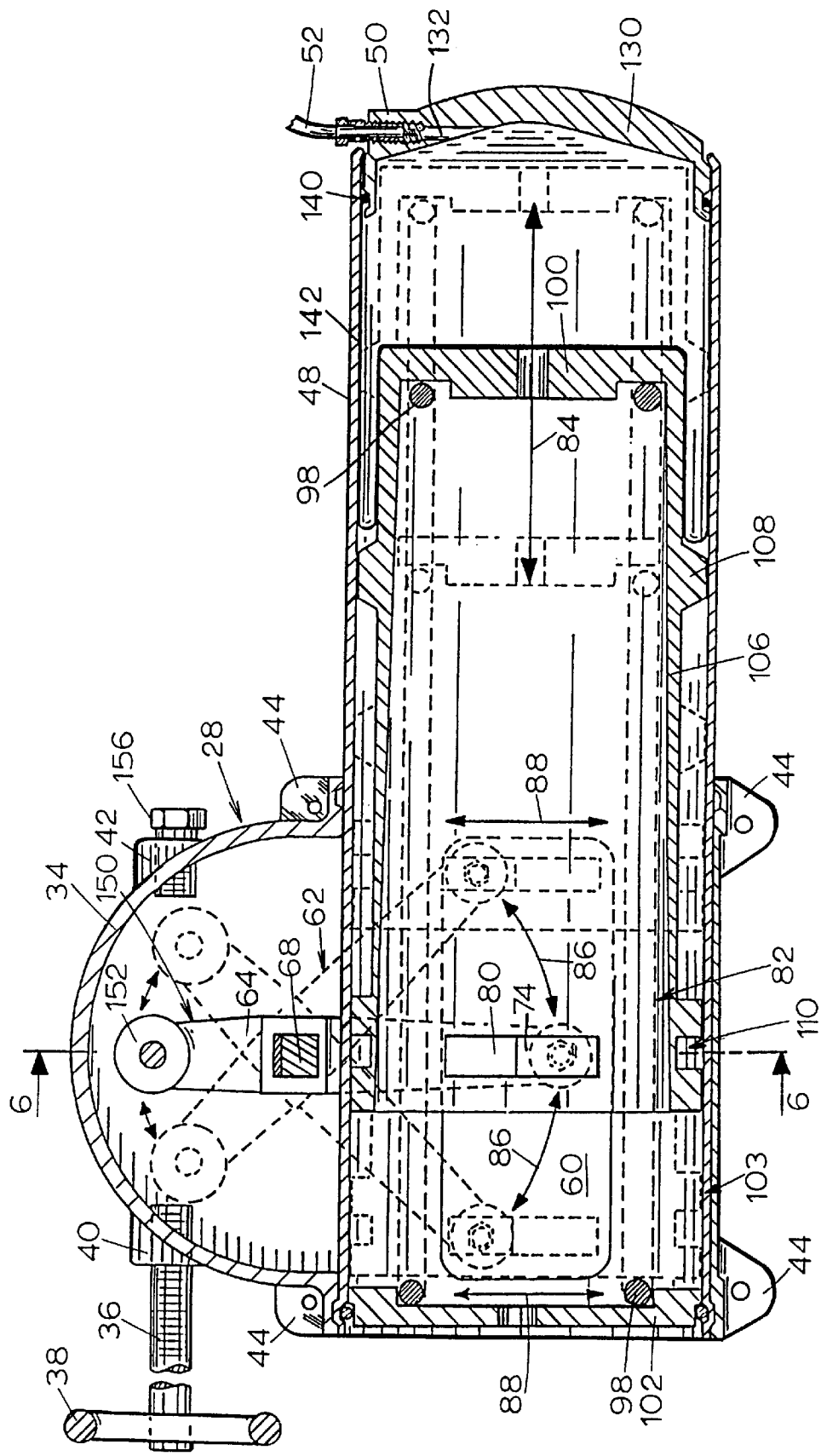
FIG. 5 is another cross-section of the actuator assembly illustrating relative positions of the actuator piston and linkage.
Figure 6:
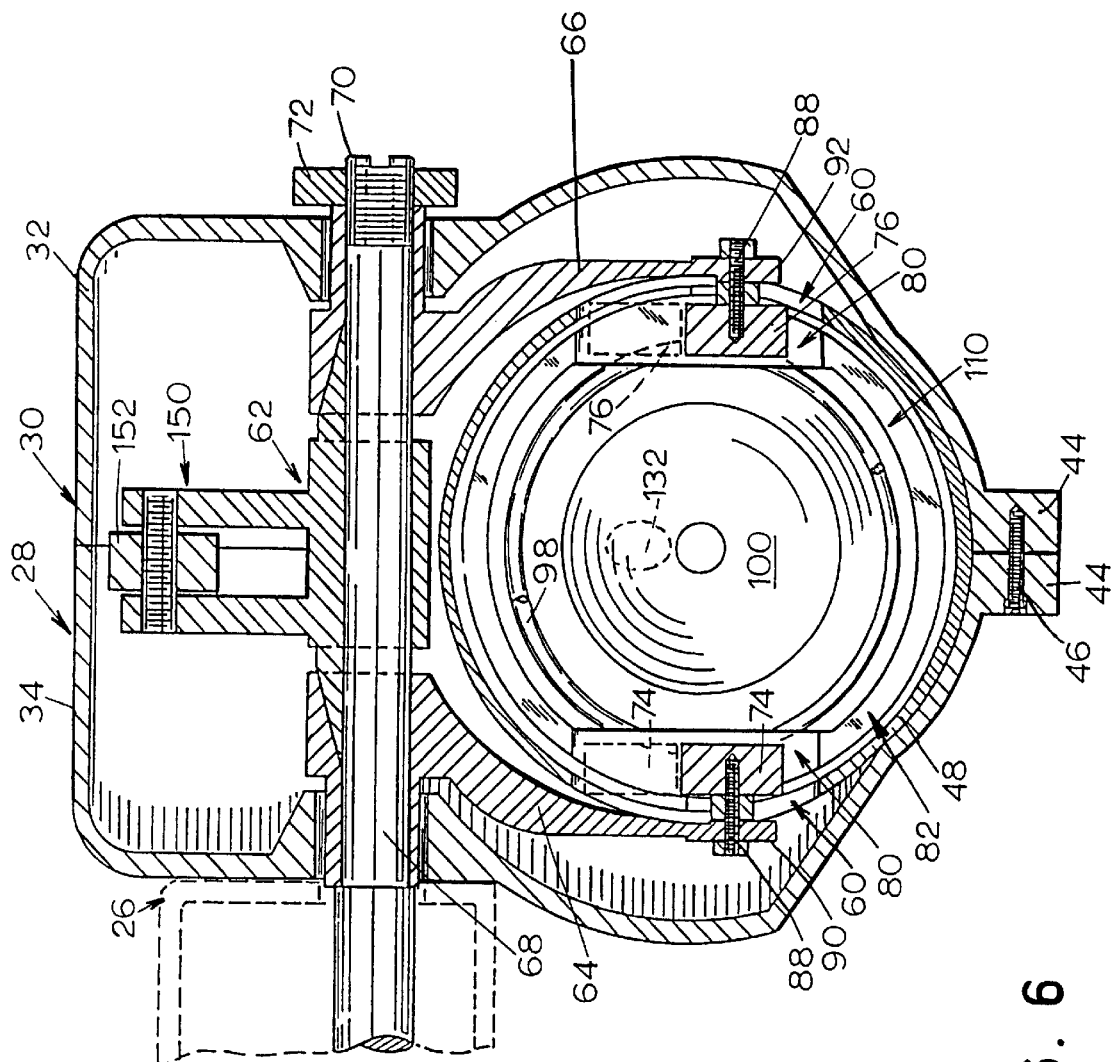
FIG. 6 is a front cross-section of the actuator assembly taken along line 6—6 of FIG. 5.

With further reference to FIGS. 4–6, the linkage 62 includes a pair of arms 64 and 66 that are seated firmly on a square cross-section shaft 68. The end 70 of the shaft 68 can be threaded (see FIG. 3) to receive a securing nut 72 as shown in FIG. 1. The mechanism for securing the arms 64 and 66 to the shaft 68 is described further below.

Each arm 64, 66 includes an associated guide block 74 and 76, respectively. The guide blocks are received by conforming slots 80 formed into the sidewalls of the actuator piston 82 of this invention. As detailed in FIG. 5, forward and rearward movement (double arrow 84) of the piston 82 within the actuator tube causes corresponding rotational movement (curved arrows 86) of the linkage 62. The blocks 74 and 76 move along respective slots 80 as the linkage 62 rotates (see double arrows 88 in FIG. 5). Hence, the slots accommodate positional change of the arm in a direction transverse to the central axis of the cylindrical tube. The blocks 74 and 76 pivot relative to their respective arms 64 and 66 to facilitate movement along the slots 80. Pivoting is accomplished using screws 88 that pivot freely relative to the arm ends 90 and 92 (FIG. 6). The piston in this embodiment is constructed from a durable plastic such as nylon or Delrin®. These materials are self-lubricating and, therefore, minimal lubrication of the piston relative to the tube is required. The piston 82 includes a hollow center that is open at the front 96 to receive a spring 98. The spring bears upon the rear wall 100 of the piston 82 and upon a fixed front wall 102 of the tube. The spring constant and applied force of the spring relative to the piston is chosen so that the spring force is overcome and the piston is moved into a fully forward position (103 in FIG. 5) when maximum pressure is applied to the actuator. In this embodiment, a maximum pressure of approximately 100 psi is contemplated generating a maximum force of approximately 500 pounds within the piston and a torque of approximately 450 inch pounds. These values can be changed depending on the size and function of the actuator assembly according to this invention.

The piston 82 of this embodiment includes a main wall section 106 that is spaced from the inner wall of the tube. Two sets of guide rings 108 and 110 engage the inner wall of the tube. By minimizing a surface contact between the piston 82 and the inner wall of the tube, friction is reduced and the risk of binding between components is minimized. The rear ring 108 has a diameter that is approximately 1/16 smaller than the inner diameter of the tube. The outer ring 110 is more closely conforming in diameter to the inner diameter of the tube. The port 60 makes more likely deformation of the tube and, thus, the more closely conforming front ring assembly 110 provides additional support to the tube at its weakest point.

As noted above, the tube of the actuator element 48 is constructed from a seamless stainless steel tube. For the depicted valve, the diameter of the tube is approximately 4 inches. Wall thickness is approximately 1/16 inch. The front end cap 102 is removable for servicing of the interior of the element 48. A snap ring 120 is seated within a recess 122 formed within the tube. The recess has sufficient depth to prevent the snap ring from moving axially out of the tube opening. The end cap 102 which is constructed from stainless steel or a similar durable material includes a shoulder 124 that bears against the snap ring. As detailed in FIGS. 2 and 3, a plastic cap 126 can be installed in a hole in the end cap. This hole and cap 126 can be omitted, however. The end cap 102 is installed and removed by biasing the cap inwardly against the spring 98 until it is clear of the snap ring 120. Once the end cap 102 is cleared of the snap ring 120, it can be removed or installed relative to the recess 124. Snap rings having large diameters as shown are available from a variety of commercial sources in Germany and elsewhere. When under spring load, it is impossible to dislodge the snap ring 120 since the peripheral shoulder 125 of the cap 102 tightly engages the inside diameter of the snap ring thereby preventing the snap ring from moving radial inwardly out of the groove 122.

The actuator element 48 also includes an opposing base cap 130 that is cast or formed into a domed shape. This domed shape aids in the maintenance of high pressure. A port 132 places the fluid line 52 in communication with the interior of the actuator element in the vicinity of the end cap 130. The end cap 130 is permanently secured to the tube by a plastically deformed end wall 134 formed in the rear end of the tube. The deformed end wall prevents the end cap 130 from moving axially outwardly away from the tube. Appropriate welds or solder joints can also be applied between the tube and the end cap. It is generally contemplated that the end cap 130 is pressed in. The end cap 130 includes an approximately cylindrical interior wall section 136 that engages the inner wall of the tube. The interior wall section 136 includes a recess 138 for receiving the base 140 duplicating as a radial static seal of a rolling diaphragm 142. The rolling diaphragm is available from a variety of commercial sources. In this embodiment, it is a nitrile-rubber reinforced fabric having a thickness of approximately 0.04 inch. The rolling diaphragm occupies the space between the main wall 106 of the piston 82 and the inner wall of the tube to the rear of the ring 108. As shown in FIG. 5, pressure causes the diaphragm to bear upon the rear wall 100 of the piston 82, thus moving the piston forwardly to the front end cap 102. The diaphragm forms a positive fluid seal within the rear of the actuator element 48. Thus, the actuator and piston assembly are open and unsealed forwardly of the diaphragm 142.

Figure 2:
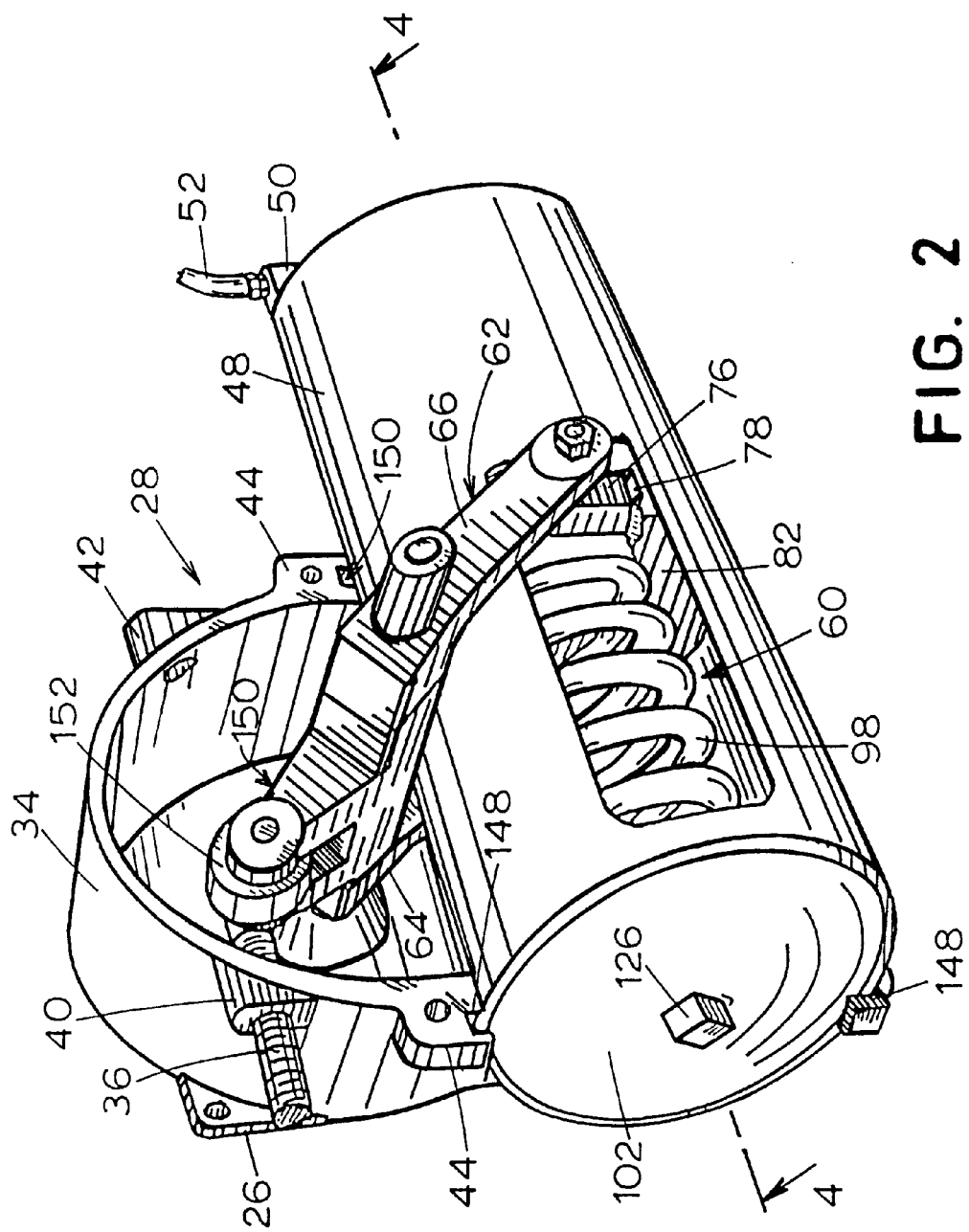
FIG. 2 is an exposed partial perspective view of the actuator assembly of FIG. 1.

It should be clear from this description that the actuator element 48 shown and described is relatively easy to construct and maintain and takes up less space than conventional actuators. It is constructed substantially free of screws or other fasteners and can be considered disposable when damaged. However, servicing of the actuator is possible via the removable front cap 102, as noted above. In addition to the above-described advantages, FIG. 2 and FIG. 3 show the added versatility of the actuator assembly according to this invention. The recess 122 adjacent the front cap 102 serves as a locating ring that seats within corresponding recesses 148 within the rear housing half 34 (FIG. 2). The actuator element 48 is sized symmetrically so that it can be rotated 180° and seated in an opposing set of recesses 149 within the rear housing half 34 (FIG. 3). Hence, the actuator element 48 can be positioned to operate in each of opposing directions relative to the valve by a simple relocation process. In this embodiment, the unused set of recesses (e.g. the recesses that do not engage the front cap assembly can be filled with an O-ring of appropriate size and thickness to more securely seat the midsection of the actuator element 48.

The upper portion of the linkage 62 includes a stop structure 150 that rotates in conjunction with the arms 64 and 66 (FIG. 5). The stop structure includes a roller 152 that reduces friction when it engages the threaded stops located within the bases 40 and 42. As described above, the screw 36 and an opposing screw (156 in FIG. 5) if desired can be moved relative to their respective bases 40 and 42 to define the limit stop positions of the linkage 62. Otherwise, the limit stop positions are defined by the minimum and maximum travel of the piston 82 within the tube of the actuator element 48. The screw 36 can also be used as a manual override in the event of pressure failure. As the screw is turned in, it causes the stop structure 150 to rotate the shaft 68, thus moving the valve gate (not shown). Movement of the stop structure 150 overcomes force imparted by the spring 98.

Figure 7:
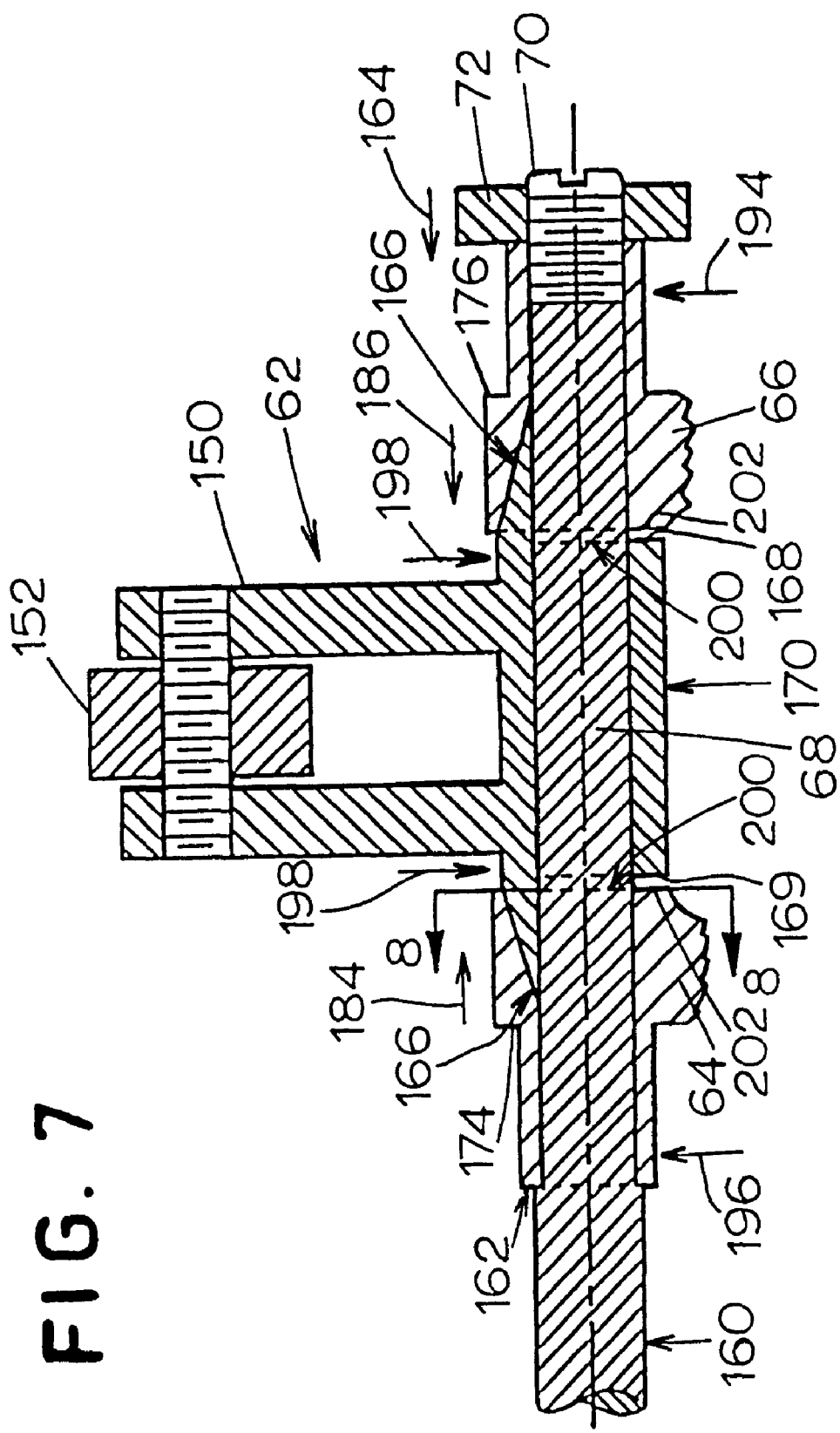
FIG. 7 is a partial cross-section of the linkage for use with the actuator assembly of the first embodiment.
Figure 8A:
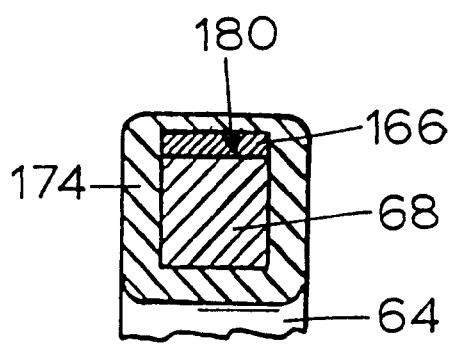
FIGS. 8A, 8B and 8C are partial cross-sections of shafts and conforming linkages taken along line 8—8 of FIG. 7.
Figure 8B:
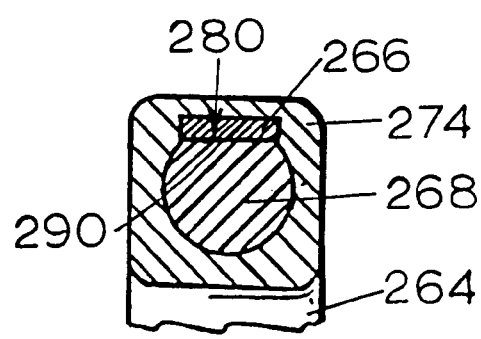
Figure 8C:
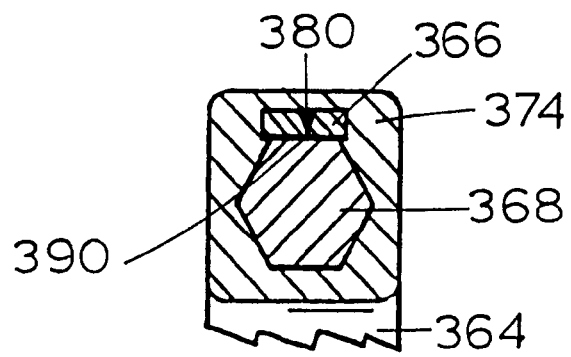
Figure 9:
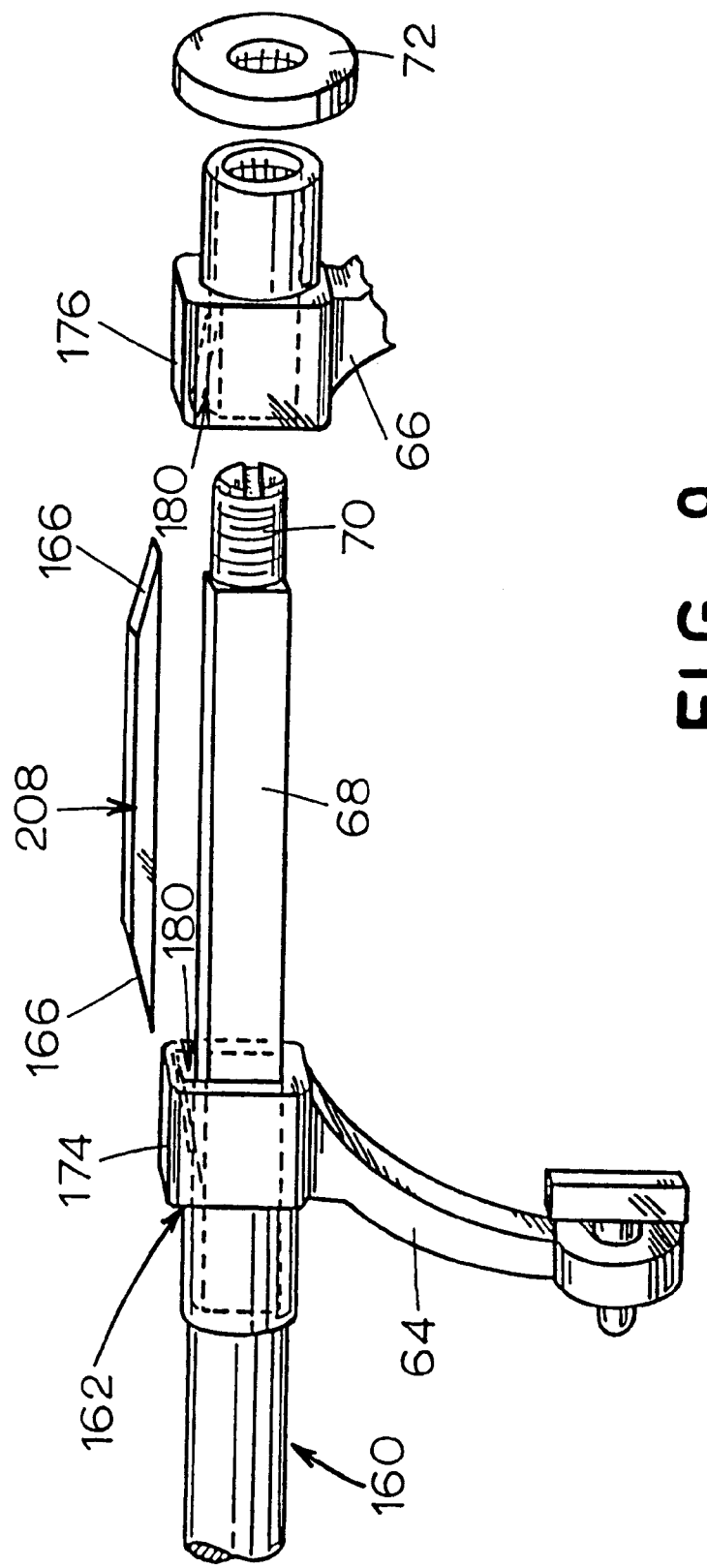
FIG. 9 is a somewhat schematic exploded view of a linkage and wedge system for use with a square cross-section shaft according to the first embodiment.

With further reference to FIGS. 7–9, the securing mechanism for a linkage 62 according to this invention is shown and described. FIG. 7 particularly illustrates the mounting of the linkage 62 on a square cross-section shaft 68 that is interconnected with the gate of a rotary valve (not shown). In this embodiment, the square cross-section portion of the shaft 68 is formed from a larger diameter round shaft in which the round portion 160 of the shaft defines a shoulder 162 against which an inner end of the arm 64 abuts. The free end of the shaft 68 in this embodiment is rounded and provided with an end section 70 having threads for receiving a nut 72. The length of the square cross-section portion of the shaft is chosen so that the nut 72 can be fully tightened to apply force (arrow 164) to the linkage assembly 62.

In this embodiment, the stop structure 150 defines a center piece of the linkage 62. It includes a square cross-section hole that relatively closely conforms to the size and shape of the square cross-section shaft 68. In this embodiment, opposing upper legs of the stop structure 150 define wedges 166 that extend in an opposing directions away from the stop structure. In particular, the wedges 166 define extensions that extend beyond the end walls 168 of the lower portion 170 of the stop structure 150. Referring also to FIGS. 8A and 9, each arm 64 and 66 includes a respective mounting base or arm end, 174 and 176 also having a square cross-section hole formed therein. These holes conformed to the size and shape of the shaft 68. Each arm end 174 and 176 also includes an inner facing triangular recess 180 that is sized and arranged to receive a respective wedge 166. The angle of the wedge can be approximately 15° more or less. This angle can be varied depending upon the application. With reference again to FIG. 7, by exerting force (arrow 164) on the linkage 62, the opposing arm ends 174 and 176 are forced into compression (arrows 184 and 186, respectively) against the wedges 166 of the stop structure 150. Since the wedges and conforming slots in the arm ends 174 and 176 are angled, they resolve the compressive force (arrows 184 and 186) into perpendicular force components (arrows 194, 196 and 198) that drive the arm ends 174 and 176 and the stop structure 150 into firm engagement with the flats of the shaft 68. The tighter the nut 72 is twisted onto the shaft end 70, the stronger the engagement of the linkage components with the flats of the shaft 68. So long as the walls of the shaft ends 174 and 176 are made sufficiently robust, a very substantial locking force can be imparted to the linkage components. This locking force substantially reduces the possibility of backlash when the arms 64 and 66 are actuated to rotate the shaft 68.

Note that, as depicted in FIG. 7, a gap 200 should be provided between the end walls 168 of the stop structure and the corresponding end walls 202 of each arm end 174 and 176. Without such a gap, the components may not have sufficient room to move perpendicularly into a fully engaged position with the flats of the shaft 68.

It should be clear that the basic principle described herein is applicable to a variety of shaft shapes. It is generally desirable that the shaft have at least one flat. For example, FIGS. 8B and 8C show shafts 268 and 368 that are, respectively, round and hexagonal. Each shaft 268 and 368 includes at least one flat 290 and 390 upon which a wedge 266 and 366 can seat. The respective arm end 274 and 374 includes a hole that conforms to the shape of the shaft with an appropriate angled cut out 280 and 380, respectively, for receiving the wedge 266 and 366. Likewise, the central wedge-carrying portion need not include a surrounding housing with a hole for receiving the shaft. Rather, as shown in FIG. 9, the center piece can comprise a single one-piece plate 208 with wedges 166 defined at each end. The length of the plate 208 or another wedge-carrying structure is infinitely variable and, thus, the arms can be positioned at a substantial distance from each other according to this invention. Furthermore, while the shaft includes an abutting wall 162, nuts or other fastening structures can be provided at both ends and adjusted to change the compression force and location of the linkage as appropriate.

It should be clear that the arm attachment mechanism described herein enables arms and shafts to be made at a slightly lower tolerance while still enabling a relatively backlash-free fit. Arms can be made using casting processes or other forming processes according to this embodiment.

Figure 10:
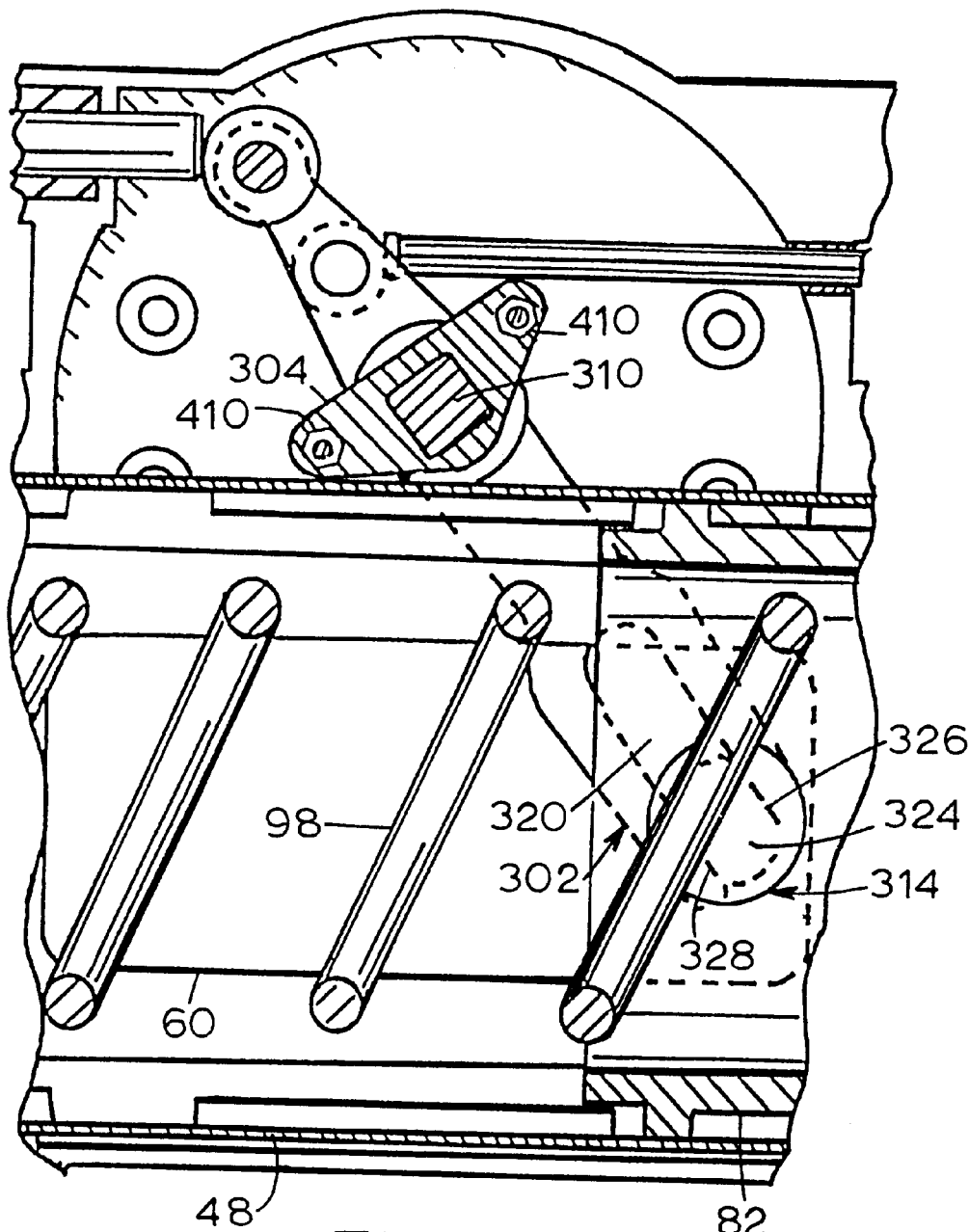
FIG. 10 is a partial cross-sectional view of a second embodiment of an actuator assembly according to the invention.
Figure 11:
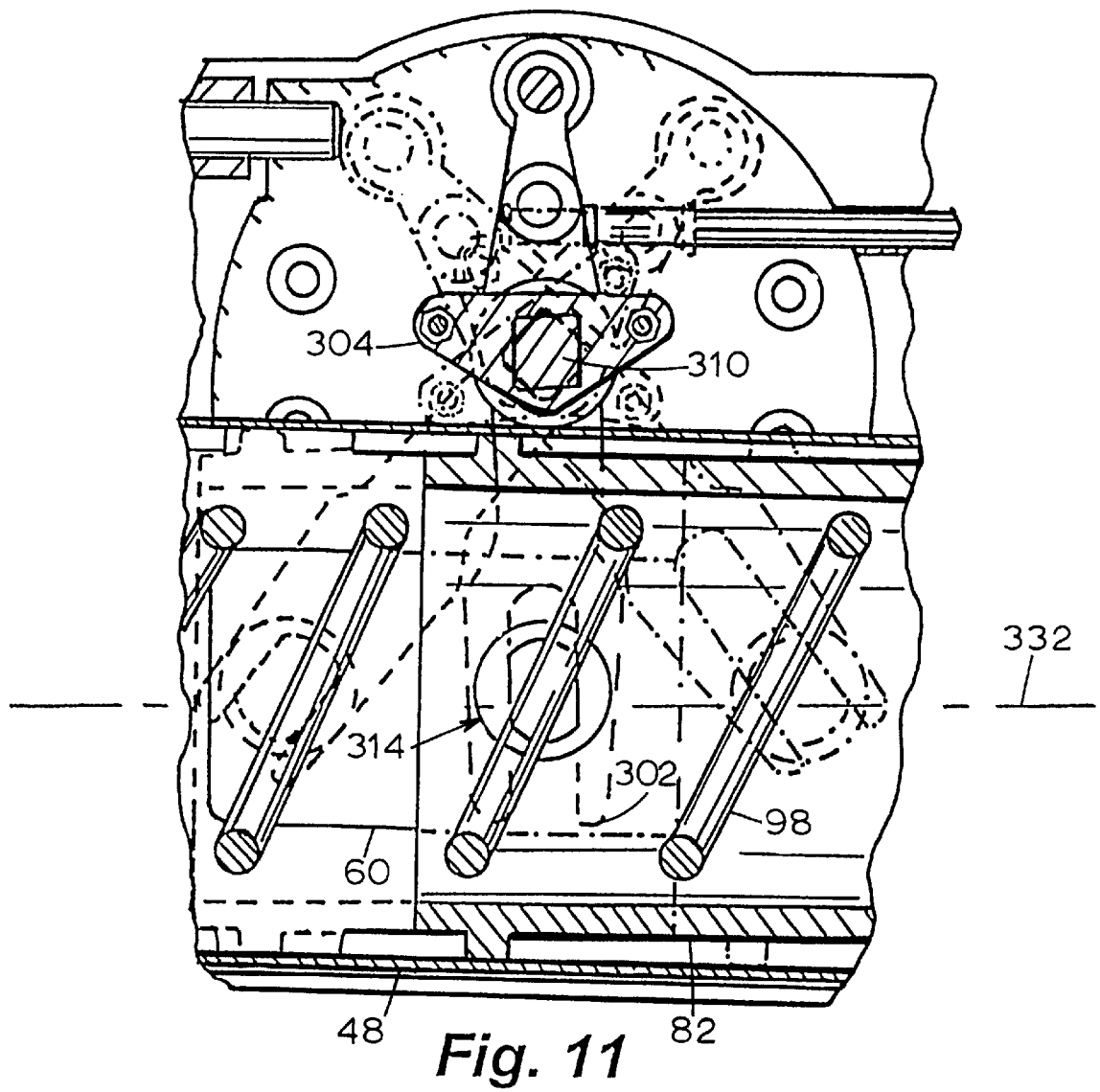
FIG. 11 is a partial cross-sectional view of the second embodiment, illustrating actuator movement.
Figure 12:
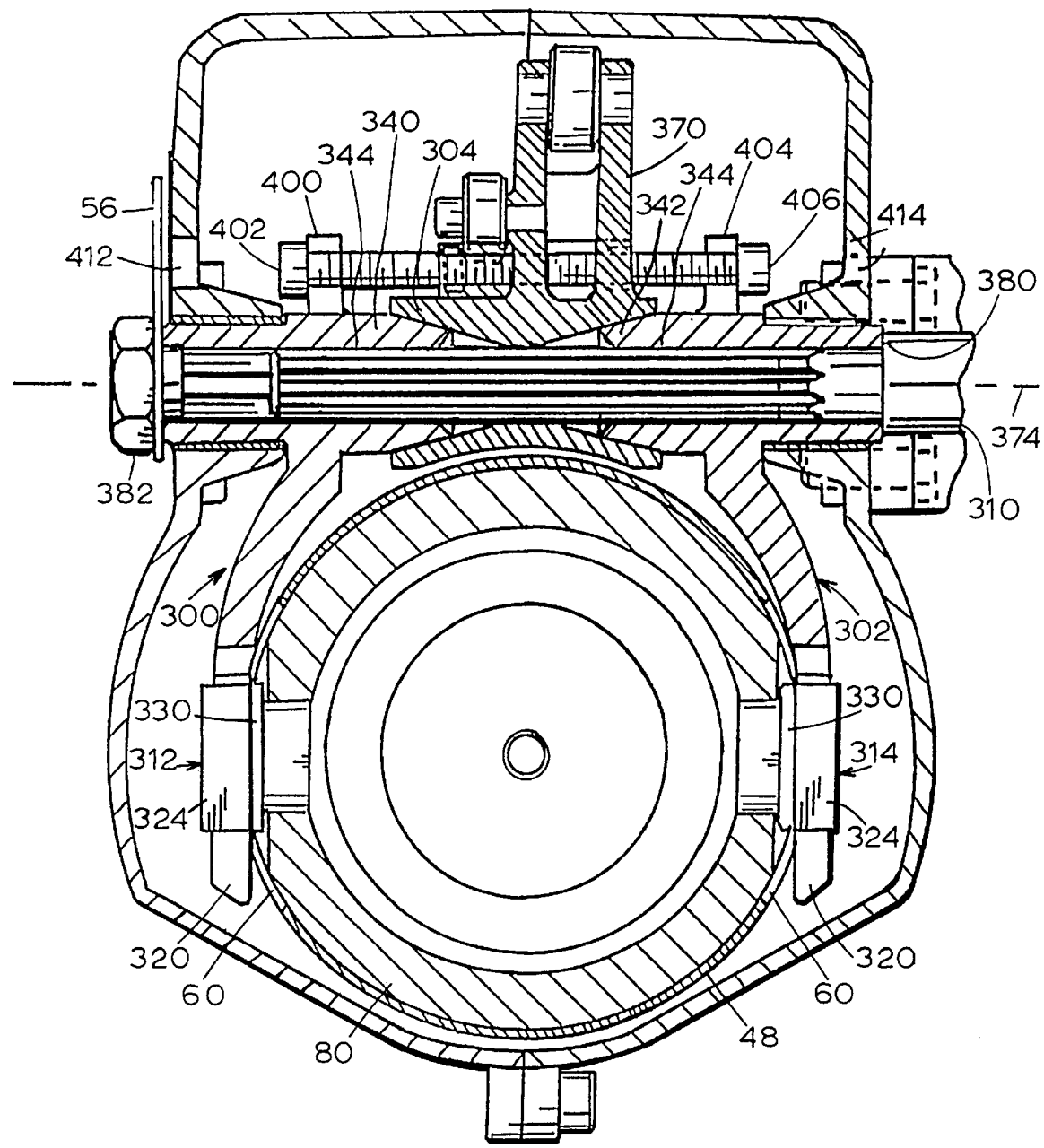
FIG. 12 is a cross-sectional view of the actuator assembly taken along the line 12—12 of FIG. 11.

A second embodiment of a linkage interconnecting the valve actuator and the rotary valve shaft is shown in FIGS. 10–14. Like elements in FIGS. 1–14 have the same reference numerals. The linkage include a linkage arm 300, a linkage arm 302 and a locking element 304, each of which is mounted on rotary valve shaft 310. The linkage further includes a connecting pin 312 for connecting linkage arm 300 to piston 82 and a connecting pin 314 for connecting linkage arm 302 to piston 82. As best shown in FIG. 12, linkage arms 300 and 302 are positioned on opposite sides of piston 82 and are interconnected via connecting pins 312 and 314 to piston 82 through ports 60 in actuator element 48.

Each of the linkage arms 300 and 302 includes an elongated slot 320. Each of the connecting pins 312 and 314 includes a cylindrical portion 322 that engages a hole in piston 82 and an arm-engaging portion 324 that engages slot 320 in the respective linkage arm. The connecting pins 312 and 314 are free to rotate in piston 82. Arm-engaging portions 324 of connecting pins 312 and 314 have flat sides 326 and 328, and are slidably movable in the slots 320 of the respective linkage arms. Each of the connecting pins 312 and 314 further includes a shoulder 330 between cylindrical portion 322 and arm-engaging portion 324. Shoulder 330 is larger in diameter than cylindrical portion 322 and is larger in diameter than the width of slot 320 in each linkage arm. As a result, connecting pins 312 and 314 are secured in position between the respective linkage arms and piston 82 without requiring fasteners of any type. The connecting pins 312 and 314 are preferably fabricated of molded plastic using nylon with lubricant fillers or a material sold under the tradename Peek®. However, it will be understood that other materials may be utilized within the scope of the invention.

In operation, piston 82 moves linearly within actuator element 48 in response to fluid pressure as described above. The connecting pins 312 and 314 are carried by the piston 82 along a linear path 332 parallel to the axis of actuator element 48, as shown in FIG. 11. As the connecting pins 312 and 314 move with piston 82, they cause the respective linkage arms 300 and 302 to rotate valve shaft 310. More specifically, arm-engaging portions 324 of connecting pins 312 and 314 slide in slots 320 of the respective linkage arms 300 and 302 and, simultaneously, the connecting pins 312 and 314 rotate with respect to piston 82, as shown in FIG. 11. This configuration provides constant torque regardless of the actuator position, because the distance between the path 332 followed by connecting pins 312 and 314 and the axis of rotation of shaft 310 is constant. Furthermore, this configuration provides greater torque near of the ends of travel of piston 82 than the configuration shown in FIGS. 2–6 and described above.

The locking element 304 assists in securely locking linkage arms 300 and 302 to valve shaft 310. As indicated in FIG. 12, linkage arm 300 includes a collet 340, and linkage arm 302 includes a collet 342. Each of the collets 340 and 342 is provided with a central bore 344 for receiving valve shaft 310 and axial slots 348 that define radially movable portions 350 and 352.

The locking element 304 is provided with a central bore 360 for receiving valve shaft 310 and recesses 362 and 364 at opposite ends of bore 360. The recesses 362 and 364 have shapes are complementary to the external shapes of collets 340 and 342, respectively. In the illustrated example, collets 340 and 342 have frustoconical external surfaces, and recesses 362 and 364 have frustoconical internal surfaces. The locking element 304 is further provided with a stop structure 370 similar in structure and function to the stop structure 150 shown in FIGS. 2–6 and described above.

Figure 13:
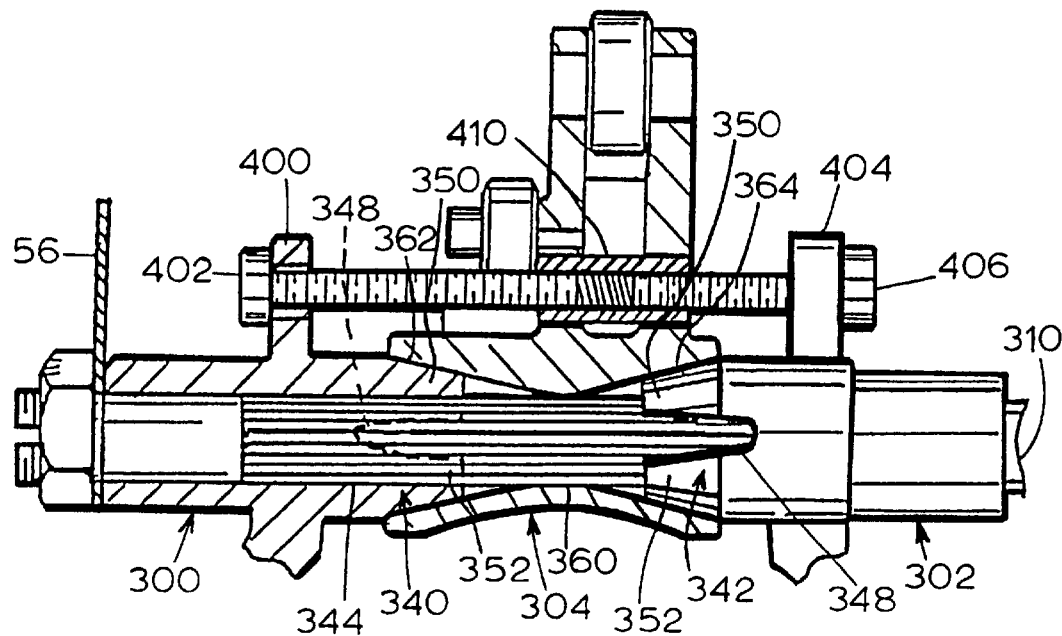
FIG. 13 is a partial cross-sectional view of the actuator assembly of FIGS. 10–12, showing a first configuration of the shaft locking mechanism.
Figure 14:
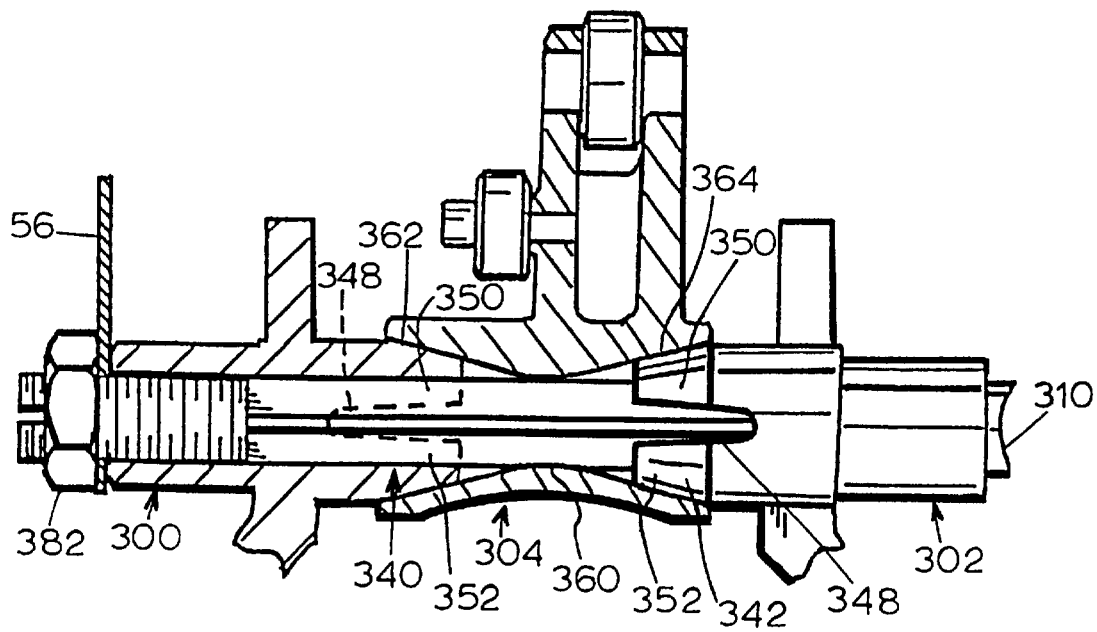
FIG. 14 is a partial cross-sectional view of the actuator assembly of FIGS. 10–12, showing a second configuration of the shaft locking mechanism.
Figure 15:
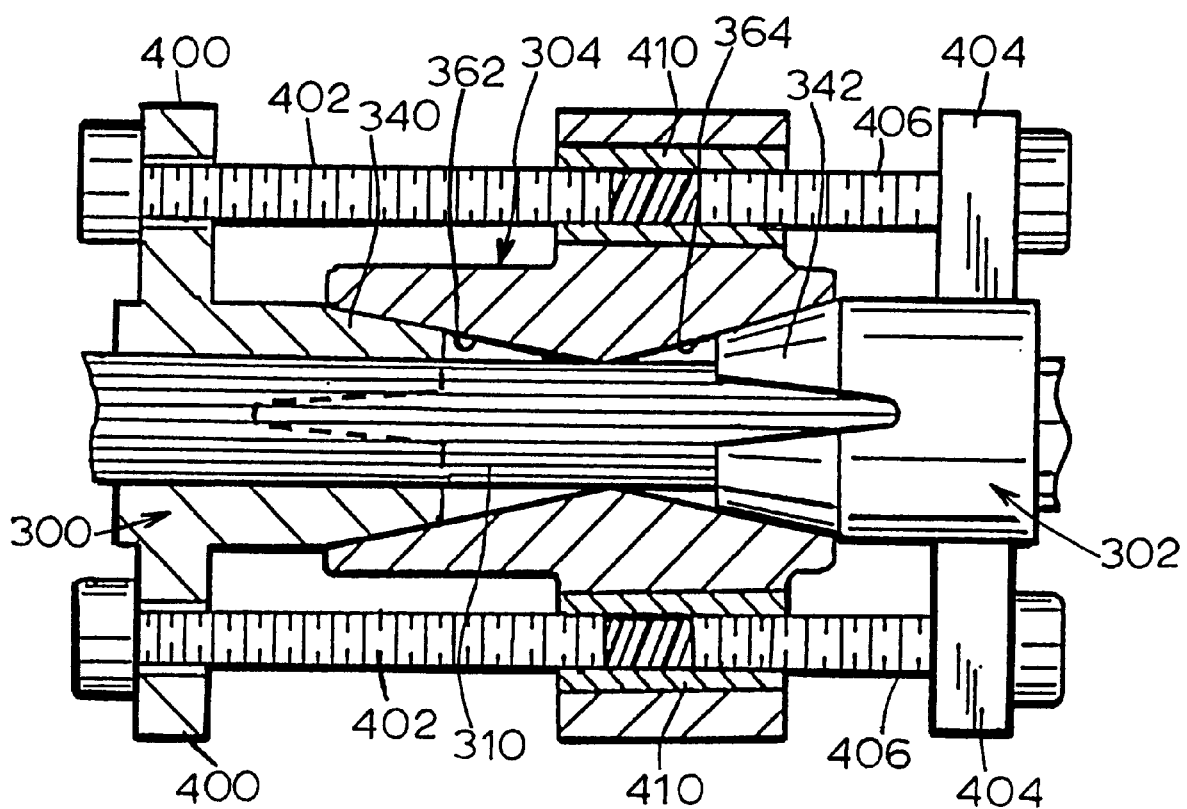
FIG. 15 is a partial t op cross-sectional view of the actuator assembly, showing the shaft locking mechanism of FIG. 13.

The valve shaft 310 may have any desired cross-sectional shape. In one configuration, the shaft 310 has a square cross section, at least in the region of linkage arms 300 and 302 and locking element 304, as shown in FIGS. 10, 11 and 14. In another configuration, the shaft 310 has a splined configuration, at least in the region of linkage arms 300 and 302, and locking element 304, as shown in FIGS. 12, 13 and 15. The bores through linkage arms 300 and 302 and locking element are dimensioned to receive valve shaft 310 and have shapes that are complementary to valve shaft 310.

The linkage further includes one or more elements for applying a force to the linkage arms such that the collets 340 and 342 are forced into the recesses 362 and 364, respectively, and the radially movable portions 350 and 352 of each of collets 340 and 342 are forced into engagement with valve shaft 310. In particular, a force is applied to linkage arms 300 and 302 in a direction parallel to an axis 374 of valve shaft 310 and toward locking element 304. The tapered walls of the frustoconical recesses 362 and 364 in locking element 304 apply forces having radial components to radially movable portions 350 and 352 of each of collets 340 and 342. The radial forces cause the radially movable portions 350 and 352 to be locked into secure engagement with valve shaft 310, so that there is no backlash or any other movement of linkage arms 300 and 302 relative to valve shaft 310 during operation of the rotary valve actuator assembly.

In a first configuration of a shaft locking mechanism, shown in FIG. 14, the elements for applying a force to the linkage arms 300 and 302 along axis 374 include an abutment 380 on valve shaft 310 located adjacent to linkage arm 302 and an adjustable fastener 382 on shaft 310 adjacent to linkage arm 300. The adjustable fastener 382 may be a nut secured on a threaded portion of valve shaft 310. When the adjustable element 382 is tightened, linkage arm 300 is forced along axis 374 toward locking element 304. Linkage arm 302 is prevented from moving axially by abutment 380. Thus, adjustment element 382 and abutment 380 apply equal and opposite axial forces to linkage arms 300 and 302, and collets 340 and 342 are forced into locking element 304. In this first configuration, the actuator assembly may be reversed with respect to the valve shaft. The adjustment element 382 is removed, and the entire assembly is removed from valve shaft and is reversed.

In a second configuration of a shaft locking mechanism, shown in FIGS. 12, 13 and 15, one or more adjustment mechanisms are secured between linkage arms 300 and 302. This embodiment does not depend on the structure of the valve shaft 310. Linkage arm 300 is provided with tabs 400, each having a hole for receiving an adjustable fastener 402, such as a bolt. Similarly, linkage arm 302 is provided with tabs 404, each having a hole for receiving a adjustable fastener 406, such as a bolt. A coupling element 410 is threaded at each end for receiving adjustable fasteners 402 and 406. Adjustable fasteners 402 and 406, and coupling element 410 constitute the adjustment mechanism. The coupling element 410 may have flat exterior surfaces and may be located in a recess in locking element 304. This configuration permits coupling element 410 to move axially as adjustable fasteners 402 and 406 are adjusted, but prevents coupling element 410 from rotating relative to locking element 304. The adjustable fasteners 402 and 406, and coupling element 410 cause linkage arms 300 and 302 to be forced toward locking element 304 as either of the adjustable fasteners 402 or 406 is tightened. The actuator housing is provided with access holes 412 and 414 (FIG. 12), which provide access to adjustable fasteners 402 and 406, respectively. Preferably, two or more adjustment mechanisms, each including two adjustable fasteners 402, 406 and a coupling element 410, are provided on opposite sides of valve shaft 310, as shown in FIG. 15, to ensure uniform force along axis 374. As fasteners 402 or 406 are tightened, collets 340 and 342 are forced into locking element 304. This configuration does not require that shaft 310 be provided with shoulder 380 and does not require element 382.

As indicated above, the actuator assembly of the present invention is preferably reversible with respect to the valve shaft. The adjustment mechanism, including adjustable fasteners 402 and 406, and coupling element 410, permits the linkage arms 300 and 302 to be locked into engagement with valve shaft 310, with the actuator in its normal position or in its reversed position. In one position, adjustable fastener 402 is adjusted through access hole 412 to force the linkage arms 300 and 302 into engagement with valve shaft 310. In the other position, adjustable fastener 406 is adjusted through access hole 414 to force linkage arms 300 and 302 into engagement with valve shaft 310.

The foregoing has been a detailed description of preferred embodiments. Various modifications and equivalents can be made without departing from the spirit and scope of this invention. For example, while a rolling diaphragm is used according to this embodiment, a sealed piston can be substituted when desirable. The size and shape of components can be varied for use with different types of rotary valves, and the actuator assembly described herein can be used with or without the unique linkage attachment mechanism as shown and described. Similarly, the linkage attachment mechanism can be applied to other structures in which it is desirable to secure arms to shafts using a quick and inexpensive technique. Accordingly, this description is meant to be taken only by way of example and not to otherwise limit the scope of the invention.

What is claimed is:

1. A rotary valve actuator assembly comprising:

a tubular housing having one or more ports therein;

a piston mounted in the tubular housing and movable relative to the tubular housing along an axis of the tubular housing;

a linkage extending through said one or more ports and coupled between the piston and a rotary shaft located entirely externally of said tubular housing, wherein movement of the piston along the axis causes the linkage to rotate the shaft, said linkage comprising at least one arm assembly including a linkage arm having a slot and a connecting pin rotatably mounted in said piston and slidably engaging the slot in said linkage arm; and a fluid pressure source coupled within the housing for moving said piston along the axis.

2. A rotary valve actuator as defined in claim 1 wherein the connecting pin is secured between the piston and the linkage arm without requiring fasteners.

3. A rotary valve actuator assembly as defined in claim 1 wherein said connecting pin is fabricated of a plastic material.

4. A rotary valve actuator assembly as defined in claim 1 wherein said linkage comprises first and second arm assemblies mounted on said shaft and coupled to opposite sides of said piston, said first and second arm assemblies each comprising a linkage arm having a slot and a connecting pin rotatably mounted in said piston and slidably engaging the slot in said linkage arm.

5. A rotary valve actuator assembly as defined in claim 4 wherein said linkage further comprises a locking element mounted on the shaft and having first and second recesses, each of said linkage arms including a collet with two or more radially movable portions, said linkage further comprising means for forcing the collets on said linkage arms into the recesses in said locking element, such that the radially movable portions of said collets are forced into engagement with said shaft and said linkage arms are locked to said shaft.

6. A rotary shaft linkage comprising:

a shaft mounted for rotation about an axis;

at least one linkage arm mounted on said shaft, said linkage arm including a collet having two or more radially movable portions;

a locking element mounted on said shaft, said locking element includes a recess; and means for forcing the collet on said linkage arm into the recess in said locking element, such that the radially movable portions of said collet are forced into engagement with said shaft and said linkage arm is locked to said shaft.

7. A rotary valve actuator assembly comprising:

a tubular housing;

a piston mounted in the tubular housing and movable relative to the tubular housing along an axis of the tubular housing;

a linkage coupled between said piston and a rotary shaft, wherein movement of the piston along the axis causes the linkage to rotate the shaft, said linkage comprising at least one arm assembly including a linkage arm coupled to said piston and mounted on said shaft, and a locking element mounted on the shaft, said linkage arm including a collet with two or more radially movable portions, said locking element having at least one recess, and means for forcing the collet on said linkage arm into the recess in said locking element, such that the radially movable portions of said collet are forced into engagement with the shaft and said linkage arm is locked to said shaft.

8. A rotary valve actuator assembly as defined in claim 7 wherein said linkage comprises first and second arm assemblies including first and second linkage arms, respectively, mounted on said shaft on opposite sides of said locking element, said locking element having first and second recesses, and wherein said means for forcing comprises means for forcing the collets on said linkage arms into the recesses in said locking element, such that the radially movable portions of said collets are forced into engagement with said shaft and said first and second linkage arms are locked to said shaft.

9. A rotary valve actuator assembly as defined in claim 8 wherein said means for forcing an abutment on said shaft for engaging said first linkage arm and an adjustable fastener on said shaft for engaging said second linkage arm, wherein adjustment of said adjustable fastener causes said collets to be forced into the recesses in said locking element.

10. A rotary valve actuator assembly as defined in claim 8 wherein said means for forcing comprises at least one adjustment mechanism secured between said first and second linkage arms, wherein adjustment of said adjustment mechanism causes the collets on said first and second linkage arms to be forced into the recesses in said locking element.

11. A rotary valve actuator assembly as defined in claim 8 wherein said means for forcing comprises at least one adjustment mechanism comprising a coupling element having threaded holes at opposite ends thereof, a first adjustable fastener coupled between said first linkage arm and said coupling element and a second adjustable fastener coupled between said second linkage arm and said coupling element, whereby adjustment of said first or second adjustable fastener causes the collets on said first and second linkage arms to be forced into the recesses in said locking element.

12. A rotary valve actuator assembly as defined in claim 9 wherein said coupling element is located within said locking element so as to permit movement parallel to an axis of said rotary shaft, while preventing rotation of said coupling element relative to said locking element.

13. A rotary valve actuator assembly as defined in claim 8 wherein each of said collets has a frustoconical external shape and is slotted to define said radially movable portions and wherein the recesses in said locking element have frustoconical shapes for receiving the respective collets.

14. A rotary valve actuator assembly as defined in claim 8 wherein said first and second linkage arms and said locking element are configured for mounting on a shaft having a square cross section.

15. A rotary valve actuator assembly as defined in claim 8 wherein said first and second linkage arms and said locking element are configured for mounted on a splined shaft.

* * * * *